United States Patent
Lee

(10) Patent No.: US 11,184,307 B2
(45) Date of Patent: Nov. 23, 2021

(54) SYSTEM, APPARATUS, METHOD, AND NON-TRANSITORY COMPUTER READABLE MEDIUM FOR PROVIDING LOCATION INFORMATION BY TRANSMITTING AN IMAGE INCLUDING THE LOCATION INFORMATION THROUGH A CHATROOM

(71) Applicant: LINE Corporation, Tokyo (JP)

(72) Inventor: SeungJun Lee, Seongnam-si (KR)

(73) Assignee: LINE CORPORATION, Tokyo (JP)

( * ) Notice: Subject to any disclaimer, the term of this patent is extended or adjusted under 35 U.S.C. 154(b) by 0 days.

(21) Appl. No.: 16/826,343

(22) Filed: Mar. 23, 2020

(65) Prior Publication Data
US 2020/0228483 A1    Jul. 16, 2020

Related U.S. Application Data

(63) Continuation of application No. 15/206,737, filed on Jul. 11, 2016, now abandoned.

(30) Foreign Application Priority Data

Sep. 9, 2015 (KR) .................. 10-2015-0127908

(51) Int. Cl.
*H04L 12/58* (2006.01)
*H04L 29/08* (2006.01)

(52) U.S. Cl.
CPC .............. *H04L 51/20* (2013.01); *H04L 51/04* (2013.01); *H04L 51/10* (2013.01); *H04L 67/16* (2013.01); *H04L 67/18* (2013.01); *H04L 51/32* (2013.01)

(58) Field of Classification Search
CPC . G06T 15/205; G06T 1/0007; G06F 3/04815; G06F 17/30265; G06F 2209/545;
(Continued)

(56) References Cited

U.S. PATENT DOCUMENTS

2003/0004916 A1  1/2003  Lewis
2008/0299997 A1*  12/2008  Klassen ............... G06F 16/958
                                               455/466

(Continued)

FOREIGN PATENT DOCUMENTS

JP    2010-186245 A    8/2010
JP    2015-014946 A    1/2015
(Continued)

OTHER PUBLICATIONS

Office Action dated Jun. 9, 2020 by the Japanese Patent Office in Japanese Application No. 2016-173578.
(Continued)

*Primary Examiner* — Hitesh Patel
(74) *Attorney, Agent, or Firm* — Sughrue Mion, PLLC

(57) ABSTRACT

An information providing system and apparatus, and method and non-transitory computer readable medium for providing location information using an image through a communication session may include connecting, at an electronic device, to a communication session with at least one another electronic device over a network receiving, at the electronic device, an image including location information from the other electronic device through the communication session, displaying, at the electronic device, the received image or information about the received image on a screen of the electronic device, providing, at the electronic device, a user interface for providing a link service associated with the image displayed on the screen or the information displayed on the screen, and providing, at the electronic device, a link service selected through the user interface based on the location information included in the image.

12 Claims, 15 Drawing Sheets

(58) Field of Classification Search
CPC .............. G06F 3/041; G06F 17/30241; G06F 17/3087; G06F 21/36; H04N 2201/3253; H04W 4/021; H04W 4/02
See application file for complete search history.

(56) References Cited

U.S. PATENT DOCUMENTS

| | | |
|---|---|---|
| 2010/0250131 A1 | 9/2010 | Relyea |
| 2012/0284638 A1 | 11/2012 | Cutler |
| 2013/0260893 A1 | 10/2013 | Shin et al. |
| 2013/0262588 A1* | 10/2013 | Barak ................ G06K 9/00221 709/204 |
| 2013/0332543 A1 | 12/2013 | Shin et al. |
| 2014/0019540 A1 | 1/2014 | Shin et al. |
| 2014/0244744 A1 | 8/2014 | Lyren |
| 2015/0111603 A1* | 4/2015 | Rivard .............. H04M 1/72457 455/456.3 |
| 2015/0261813 A1* | 9/2015 | Pappula ................ H04L 51/32 707/758 |
| 2016/0014561 A1 | 1/2016 | Inzer |
| 2017/0034085 A1 | 2/2017 | Bijor |
| 2017/0219358 A1* | 8/2017 | Rolf ........................ G01C 21/30 |
| 2017/0316599 A1* | 11/2017 | Giunio-Zorkin ............................ G06F 16/24573 |

FOREIGN PATENT DOCUMENTS

| | | |
|---|---|---|
| JP | 2015-018488 A | 1/2015 |
| KR | 100651677 B1 | 11/2006 |
| KR | 20100067594 A | 6/2010 |
| KR | 101080306 B1 | 11/2011 |
| KR | 20140132977 A | 11/2014 |
| WO | 2015065001 A1 | 5/2015 |

OTHER PUBLICATIONS

Korean Office Action dated Jul. 13, 2016 in counterpart Korean Patent Application No. 10-2015-0127908.

* cited by examiner

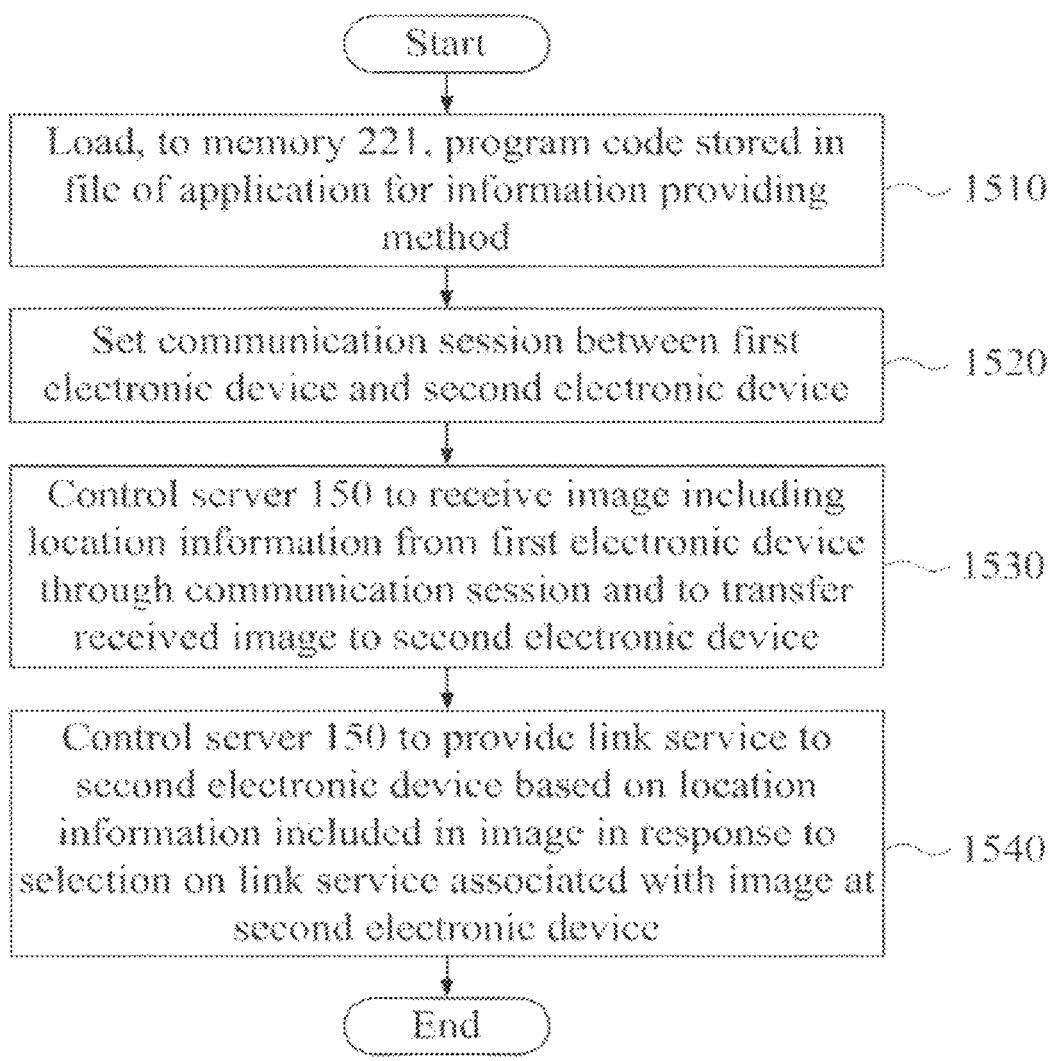

SYSTEM, APPARATUS, METHOD, AND NON-TRANSITORY COMPUTER READABLE MEDIUM FOR PROVIDING LOCATION INFORMATION BY TRANSMITTING AN IMAGE INCLUDING THE LOCATION INFORMATION THROUGH A CHATROOM

CROSS-REFERENCE TO RELATED APPLICATION(S)

This application is a continuation of U.S. application Ser. No. 15/206,737, filed Jul. 11, 2016, which claims the benefit of priority under 35 U.S.C. § 119 to Korean Patent Application No. 10-2015-0127908 filed Sep. 9, 2015, in the Korean Intellectual Property Office (KIPO), the entire contents of which are incorporated herein by reference.

BACKGROUND

Field

One or more example embodiments relate to an information providing system and/or apparatus, and/or a method and/or non-transitory computer readable media for providing location information using an image through a communication session.

Description of Related Art

An instant messaging service may use various techniques for sharing location information. For example, in the related art, location information of a first mobile communication terminal corresponding to a logon time of an instant message is transmitted to a second mobile communication terminal.

SUMMARY

One or more example embodiments provide an information providing method and/or an information providing system that may transfer a location of an electronic device corresponding to a time at which a photo is taken, a current location of the electronic device, and/or a location desired and/or preset by a user for each image by transferring a photo or an image, such as a sticker, in which location information between electronic devices is included over a network.

At least one example embodiment provides an information providing method performed using an electronic device including connecting, using at least one processor, to a communication session with at least one second electronic device over a network, receiving, using the at least one processor, an image including location information from the at least one second electronic device through the communication session; generating, using the at least one processor, a user interface including the received image or information related to the received image, displaying, using the at least one processor, the generated user interface on a screen of the electronic device, generating, using the at least one processor, on the user interface at least one link service associated with the image or the received image information, and providing, using the at least one processor, a link service selected through the user interface based on the location information included in the image.

The location information may include information about a location corresponding to a time at which the image was created, and the image may be created using at least one of the at least one second electronic device and at least one third electronic device that uploaded the image onto a website.

The providing the link service may include providing a route guide service related to a location corresponding to the location information using a map image.

The providing of the link service may include receiving a second image including location information associated with the location information from a server, the server having set the communication session, and displaying the second image on the screen. The server may be configured to determine an area range based on the location information included in the image, search a database for at least one third image including location information belonging within the area range, and transmit the third image to the electronic device.

The generating on the user interface at least one link service may include displaying a location sharing interface in association with an area on which the image or information about the image is displayed on the screen of the electronic device. The providing the link service may include displaying a map image on which a location corresponding to the location information is marked on the screen of the electronic device, in response to a selection on the location sharing interface.

The providing the link service may include displaying the image on an area associated with the location marked on the map image or a desired area of the screen of the electronic device.

The image may further include text information input from a creator of the image or an editor. The providing the link service may include displaying the text information associated with the location marked on the map image on the screen of the electronic device.

The receiving the image may include receiving the image that is transmitted from the at least one second electronic device using the communication session through a server having set the communication session. The image may further include at least one of initial transmitter information of the image and valid period information for the location information.

The server may be configured to transfer, to the electronic device, the image with the initial transmitter information and the location information removed, if a desired relationship is not set between the initial transmitter of the image and a user of the electronic device based on the initial transmitter information.

The server may be configured to transfer, to the electronic device, the image in which the location information is removed, if a valid period of the location information is expired based on the valid period information included in the image.

The image may include a sticker image selected at the at least one second electronic device from among a plurality of sticker images provided by the at least one second electronic device through a messaging service.

The messaging service may be provided from a server having set the communication session.

The location information may include a location of the at least one second electronic device corresponding to a time at which the sticker image is selected at the at least one second electronic device or a location input and stored in advance from the at least one second electronic device with respect to the selected sticker image.

At least one example embodiment also provides an information providing method including connecting, at an electronic device, to a communication session with at least one another electronic device over a network, selecting, at the electronic device, an image including location information, and transmitting, at the electronic device, the selected image to the other electronic device through the communication session. A user interface for providing a link service associated with the image is provided from the other electronic device, and the link service selected through the user interface is provided to a user of the other electronic device based on the location information included in the image.

At least one example embodiment also provides a system including a memory having computer-readable instructions stored thereon, and at least one processor configured to execute the computer-readable instructions to set a communication session between a first electronic device and a second electronic device, receive an image including location information from the first electronic device through the communication session and to transfer the received image to the second electronic device, and provide at least one link service associated with the image to the second electronic device based on the location information included in the image, in response to a selection from the second electronic device related to the at least one link service.

The location information may include information about a location corresponding to a time at which the image was created. The image may be created by at least one of the first electronic device and a third electronic device that uploaded the image onto a website.

The at least one processor may be further configured to provide a route guide service related to a location corresponding to the location information to the second electronic device using a map image.

The at least one processor may be further configured to determine an area range based on the location information included in the image in response to a selection on a link service associated with the image, search a database or a website for a second image including location information belonging to the area range, and transmit the second image to the second electronic device.

The at least one processor may be further configured to transmit a map image on which a location corresponding to the location information is marked to the second electronic device in response to the link service selected at the second electronic device.

The image may further include initial transmitter information of the image. The at least one processor may be further configured to transfer, to the second electronic device, the image with the initial transmitter information and the location information removed, if a desired relationship is not set between an initial transmitter of the image and a user of the second electronic device based on the initial transmitter information.

The image may further include valid period information for the location information. The at least one processor may be further configured to transfer, to the second electronic device, the image with the location information is removed, if a valid period of the location information is expired based on the valid period information included in the image.

The at least one processor may be further configured to transmit a plurality of sticker images to the first electronic device through a messaging service, and receive, as the image, a sticker image selected at the first electronic device from among the plurality of sticker images.

The location information may include a location of the first electronic device corresponding to a time at which the sticker image is selected at the first electronic device or a location input from the first electronic device with respect to the selected sticker image.

According to at least some example embodiments, it is possible to transfer a location of an electronic device corresponding to a time at which a photo is taken, a current location of the electronic device, and/or a location desired and/or preset by a user for each image by transferring a photo or an image, such as a sticker, in which location information between electronic devices is included over a network.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

Example embodiments will be described in more detail with regard to the figures, wherein like reference numerals refer to like parts throughout the various figures unless otherwise specified, and wherein:

FIG. 15 is a flowchart illustrating an example of a method performed at a server according to at least one example embodiment.

Figure 1:
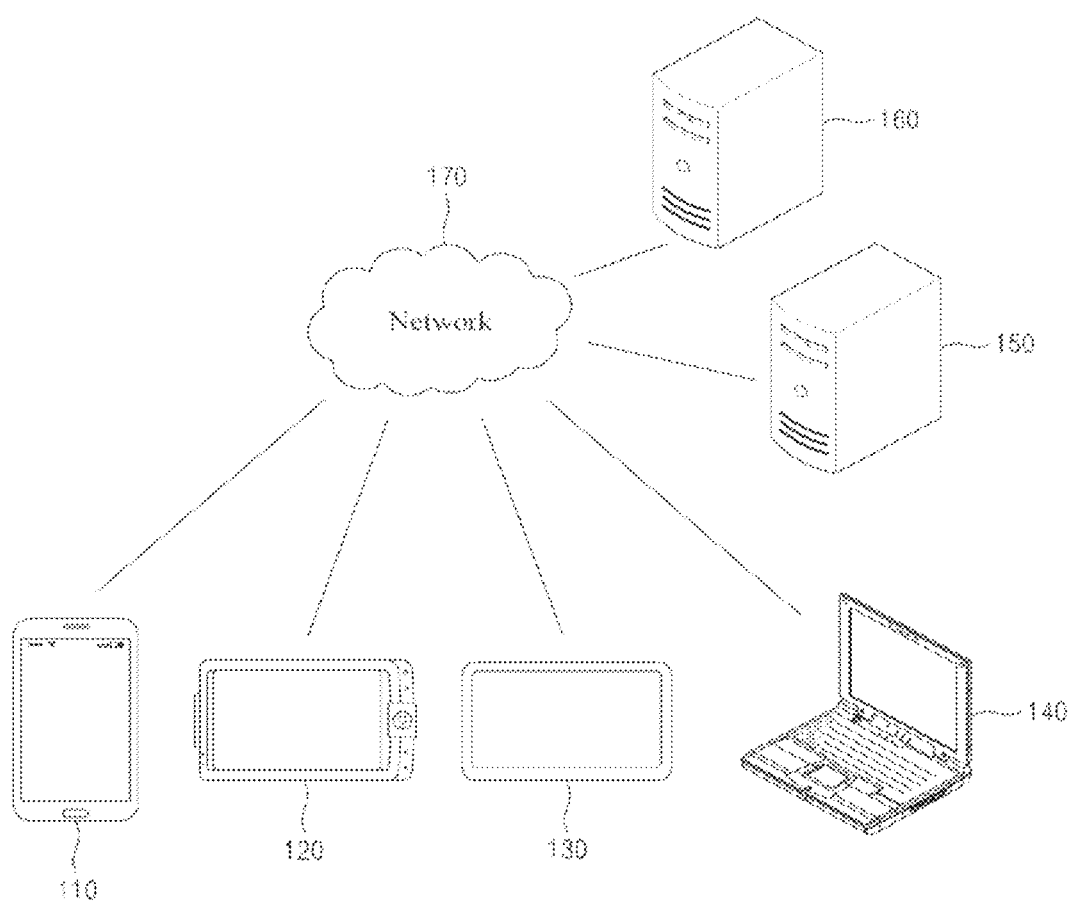
FIG. 1 illustrates an example of a network environment according to at least one example embodiment.

It should be noted that these figures are intended to illustrate the general characteristics of methods and/or structure utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments.

DETAILED DESCRIPTION

One or more example embodiments will be described in detail with reference to the accompanying drawings. Example embodiments, however, may be embodied in various different forms, and should not be construed as being limited to only the illustrated embodiments. Rather, the illustrated embodiments are provided as examples so that this disclosure will be thorough and complete, and will fully convey the concepts of this disclosure to those skilled in the art. Accordingly, known processes, elements, and techniques, may not be described with respect to some example embodiments. Unless otherwise noted, like reference characters denote like elements throughout the attached drawings and written description, and thus descriptions will not be repeated.

Although the terms "first," "second," "third," etc., may be used herein to describe various elements, components, regions, layers, and/or sections, these elements, components, regions, layers, and/or sections, should not be limited by these terms. These terms are only used to distinguish one element, component, region, layer, or section, from another region, layer, or section. Thus, a first element, component, region, layer, or section, discussed below may be termed a second element, component, region, layer, or section, without departing from the scope of this disclosure.

Spatially relative terms, such as "beneath," "below," "lower," "under," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below," "beneath," or "under," other elements or features would then be oriented "above" the other elements or features. Thus, the example terms "below" and "under" may encompass both an orientation of above and below. The device may be otherwise oriented (rotated 90 degrees or at other orientations) and the spatially relative descriptors used herein interpreted accordingly. In addition, when an element is referred to as being "between" two elements, the element may be the only element between the two elements, or one or more other intervening elements may be present.

As used herein, the singular forms "a," "an," and "the," are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups, thereof. As used herein, the term "and/or" includes any and all combinations of one or more of the associated listed items. Expressions such as "at least one of," when preceding a list of elements, modify the entire list of elements and do not modify the individual elements of the list. Also, the term "exemplary" is intended to refer to an example or illustration.

When an element is referred to as being "on," "connected to," "coupled to," or "adjacent to," another element, the element may be directly on, connected to, coupled to, or adjacent to, the other element, or one or more other intervening elements may be present. In contrast, when an element is referred to as being "directly on," "directly connected to," "directly coupled to," or "immediately adjacent to," another element there are no intervening elements present.

Unless otherwise defined, all terms (including technical and scientific terms) used herein have the same meaning as commonly understood by one of ordinary skill in the art to which example embodiments belong. Terms, such as those defined in commonly used dictionaries, should be interpreted as having a meaning that is consistent with their meaning in the context of the relevant art and/or this disclosure, and should not be interpreted in an idealized or overly formal sense unless expressly so defined herein.

Example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order.

Units and/or devices according to one or more example embodiments may be implemented using hardware and/or a combination of hardware and software. For example, hardware devices may be implemented using processing circuitry such as, but not limited to, a processor, Central Processing Unit (CPU), a controller, an arithmetic logic unit (ALU), a digital signal processor, a microcomputer, a field programmable gate array (FPGA), a System-on-Chip (SoC), a programmable logic unit, a microprocessor, or any other device capable of responding to and executing instructions in a defined manner.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

For example, when a hardware device is a computer processing device (e.g., a processor, Central Processing Unit (CPU), a controller, an arithmetic logic unit (ALU), a digital signal processor, a microcomputer, a microprocessor, etc.), the computer processing device may be configured to carry out program code by performing arithmetical, logical, and input/output operations, according to the program code. Once the program code is loaded into a computer processing device, the computer processing device may be programmed to perform the program code, thereby transforming the computer processing device into a special purpose computer processing device. In a more specific example, when the program code is loaded into a processor, the processor becomes programmed to perform the program code and operations corresponding thereto, thereby transforming the processor into a special purpose processor.

Software and/or data may be embodied permanently or temporarily in any type of machine, component, physical or virtual equipment, or computer storage medium or device, capable of providing instructions or data to, or being interpreted by, a hardware device. The software also may be distributed over network coupled computer systems so that the software is stored and executed in a distributed fashion. In particular, for example, software and data may be stored by one or more computer readable recording mediums, including the tangible or non-transitory computer-readable storage media discussed herein.

According to one or more example embodiments, computer processing devices may be described as including various functional units that perform various operations and/or functions to increase the clarity of the description. However, computer processing devices are not intended to be limited to these functional units. For example, in one or more example embodiments, the various operations and/or functions of the functional units may be performed by other ones of the functional units. Further, the computer processing devices may perform the operations and/or functions of the various functional units without sub-dividing the operations and/or functions of the computer processing units into these various functional units.

Units and/or devices according to one or more example embodiments may also include one or more storage devices. The one or more storage devices may be tangible or non-transitory computer-readable storage media, such as random access memory (RAM), read only memory (ROM), a permanent mass storage device (such as a disk drive), solid state (e.g., NAND flash) device, and/or any other like data storage mechanism capable of storing and recording data. The one or more storage devices may be configured to store computer programs, program code, instructions, or some combination thereof, for one or more operating systems and/or for implementing the example embodiments described herein. The computer programs, program code, instructions, or some combination thereof, may also be loaded from a separate computer readable storage medium into the one or more storage devices and/or one or more computer processing devices using a drive mechanism. Such separate computer readable storage medium may include a Universal Serial Bus (USB) flash drive, a memory stick, a Blu-ray/DVD/CD-ROM drive, a memory card, and/or other like computer readable storage media. The computer programs, program code, instructions, or some combination thereof, may be loaded into the one or more storage devices and/or the one or more computer processing devices from a remote data storage device via a network interface, rather than via a local computer readable storage medium. Additionally, the computer programs, program code, instructions, or some combination thereof, may be loaded into the one or more storage devices and/or the one or more processors from a remote computing system that is configured to transfer and/or distribute the computer programs, program code, instructions, or some combination thereof, over a network. The remote computing system may transfer and/or distribute the computer programs, program code, instructions, or some combination thereof, via a wired interface, an air interface, and/or any other like medium.

The one or more hardware devices, the one or more storage devices, and/or the computer programs, program code, instructions, or some combination thereof, may be specially designed and constructed for the purposes of the example embodiments, or they may be known devices that are altered and/or modified for the purposes of example embodiments.

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as one computer processing device; however, one skilled in the art will appreciate that a hardware device may include multiple processing elements and multiple types of processing elements. For example, a hardware device may include multiple processors or a processor and a controller. In addition, other processing configurations are possible, such as parallel processors.

Although described with reference to specific examples and drawings, modifications, additions and substitutions of example embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

Example embodiments relate to technology for recommending a meeting place based on appointment information. In detail, the example embodiments relate to a method, system, and non-transitory computer-readable medium that may provide appointment information of a meeting associated with users to affiliated stores, may receive recommendation information about a meeting place from the affiliated stores, and may provide the received recommendation information to the users.

FIG. 1 is a diagram illustrating an example of a network environment according to at least one example embodiment. Referring to FIG. 1, the network environment includes a plurality of electronic devices 110, 120, 130, and 140, a plurality of servers 150 and 160, and a network 170. FIG. 1 is provided as only an example and thus, the number of electronic devices and/or the number of servers are not limited thereto and may contain greater or lesser number of constituent elements.

Each of the plurality of electronic devices 110, 120, 130, and 140 may be a fixed terminal, or a mobile terminal, configured as a computer device. For example, the plurality of electronic devices 110, 120, 130, and 140 may be a smartphone, a mobile phone, a personal navigation device, a computer, a laptop computer, a digital broadcasting terminal, a personal digital assistant (PDA), a portable multimedia player (PMP), a tablet PC, a smart device, a wearable device, a virtual reality device, and the like. For example, the electronic device 110 may communicate with the other electronic devices 120, 130, and 140, and/or the servers 150 and/or 160 over the network 170 in a wired communication manner or in a wireless communication manner.

The communication scheme is not particularly limited and may include a communication method that uses a near field communication (NFC) between devices as well as a communication method using a communication network, for example, a mobile communication network, the wired Internet, the wireless Internet, a broadcasting network, a satellite network, a cellular network, etc. For example, the network 170 may include at least one of network topologies that include networks, for example, a personal area network (PAN), a local area network (LAN), a campus area network (CAN), a metropolitan area network (MAN), a wide area network (WAN), a broadband network (BBN), the Internet, and the like. Also, the network 170 may include at least one of a bus network, a star network, a ring network, a mesh network, a star-bus network, a tree or hierarchical network, and the like. However, these are only examples and the example embodiments are not limited thereto.

Each of the servers 150 and 160 may be configured as a computer apparatus, or a plurality of computer apparatuses that are communicably connected to each other, that provides instructions, codes, file, contents, services, and the like through communication with the plurality of electronic devices 110, 120, 130, and/or 140 over the network 170.

For example, the server 160 may provide a file for installing an application to the electronic device 110 connected over the network 170. In this case, the electronic device 110 may install the application using the file provided from the server 160. The electronic device 110 may use a service and/or content provided from the server 150 by connecting to the server 150 under control of at least one program, for example, a browser or the installed application and an operating system (OS) included in the electronic device 110. For example, in response to a service request message transmitted from the electronic device 110 to the server 150 over the network 170 under control of the application, the server 150 may transmit a code corresponding to the service request message to the electronic device 110. The electronic device 110 may provide content to a user by displaying a code-based screen under the control of the application. As another example, the server 150 may set a communication session for a messaging service and may route transmission and/or reception of a message between the plurality of electronic devices 110, 120, 130, and/or 140 through the set communication session.

Figure 2:
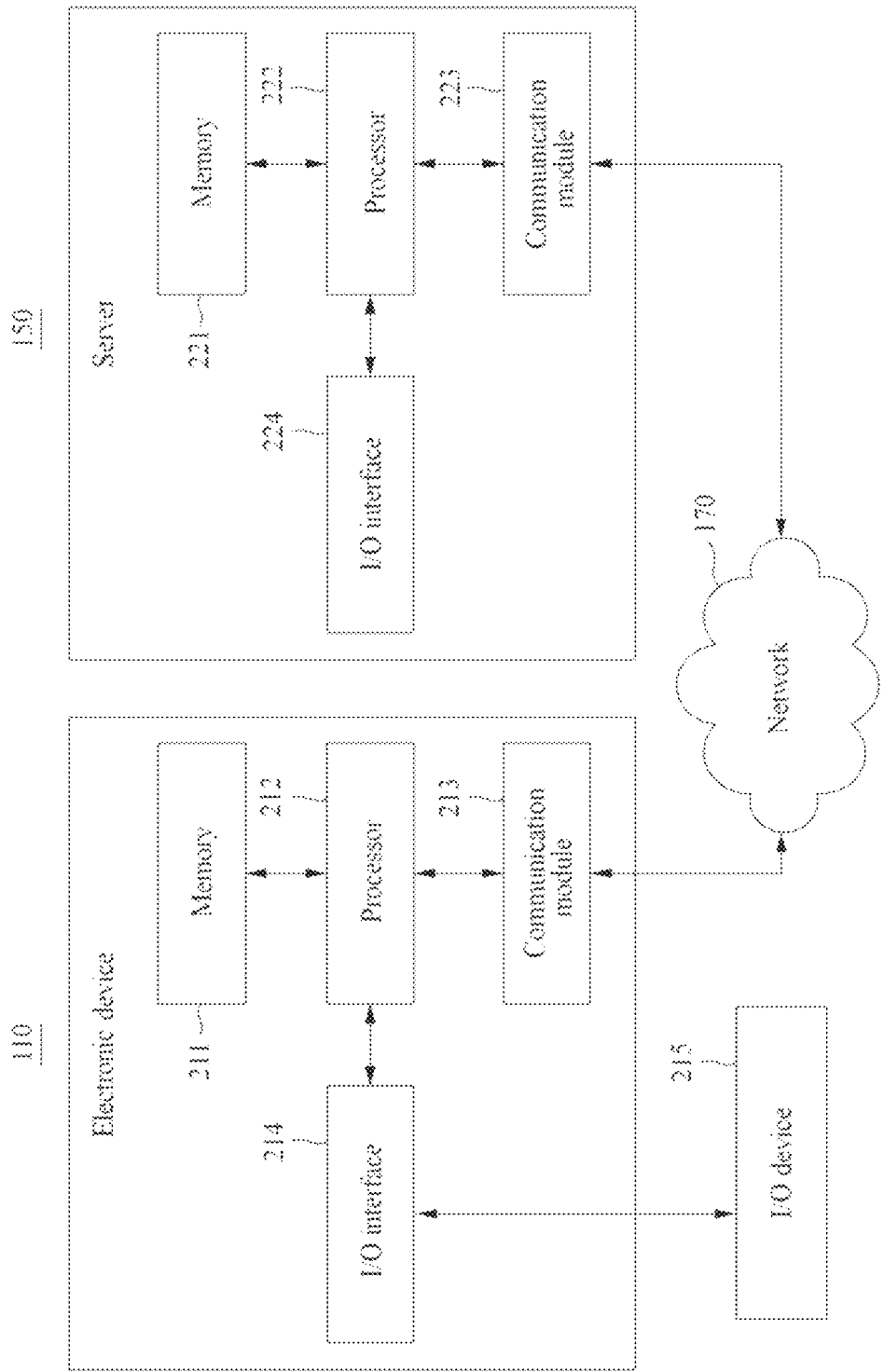
FIG. 2 is a block diagram illustrating an example of a configuration of an electronic device and a server according to at least one example embodiment.

FIG. 2 is a block diagram illustrating an example configuration of an electronic device and a server according to at least one example embodiment. FIG. 2 illustrates a configuration of the electronic device 110 as an example for a single electronic device and illustrates a configuration of the server 150 as an example for a single server. The electronic devices 120, 130, and 140, and/or the server 160 may have the same or similar configuration to the electronic device 110 and/or the server 150.

Referring to FIG. 2, the electronic device 110 may include a memory 211, a processor 212, a communication module 213, and an input/output (I/O) interface 214, but is not limited thereto and, for example, may include additional constituent elements, such as a plurality of interconnected processors, etc. The server 150 may include a memory 221, a processor 222, a communication module 223, and an I/O interface 224, but is not limited thereto and, for example, may include additional constituent elements, such as a plurality of interconnected processors, etc. The memory 211, 221 may include a permanent mass storage device, such as random access memory (RAM), read only memory (ROM), a disk drive, a solid state drive, etc., as a non-transitory computer-readable storage medium. Also, an OS and at least one program code, for example, the aforementioned code for the browser or the application installed and executed on the electronic device 110, may be stored in the memory 211, 221. Such software constituent elements may be loaded from another non-transitory computer-readable storage medium separate from the memory 211, 221 using a drive mechanism. The other non-transitory computer-readable storage medium may include, for example, a floppy drive, a disk, a tape, a DVD/CD-ROM drive, a memory card, etc.

According to other example embodiments, software constituent elements may be loaded to the memory 211, 221 through the communication module 213, 223, instead of, or in addition to, the non-transitory computer-readable storage medium. For example, at least one program may be loaded to the memory 211, 221 based on a program, for example, the application, installed by files provided over the network 170 from developers or a file distribution system, for example, the server, that provides an installation file of the application.

The processor 212, 222 may be configured to process computer-readable instructions, for example, the aforementioned at least one program code, of a computer program by performing basic arithmetic operations, logic operations, and I/O operations. The computer-readable instructions may be provided from the memory 211, 221 and/or the communication module 213, 223 to the processor 212, 222, and when executed by the processor 212, 222, transforms the processor 212, 222 into a special purpose processor. For example, the processor 212, 222 may be configured to execute received instructions in response to the program code stored in the storage device, such as the memory 211, 222.

The communication module 213, 223 may provide a function for communication between the electronic device 110 and the server 150 over the network 170, and may provide a function for communication with another electronic device, for example, the electronic device 120 or another server, for example, the server 160. For example, the processor 212 of the electronic device 110 may transfer a request, for example, a request for content from a streaming service, generated based on a program code stored in the storage device such as the memory 211, to the server 150 over the network 170 under control of the communication module 213. Inversely, a control signal, an instruction, content, file, etc., provided under the control of the processor 222 of the server 150 may be received at the electronic device 110 through the communication module 213 of the electronic device 110 by going through the communication module 223 and the network 170. For example, a control signal, an instruction, a message, etc., of the server 150 received through the communication module 213 may be transferred to the processor 212 or the memory 211, and content, files, etc., may be stored in a storage medium further includable in the electronic device 110.

The I/O interface 214, 224 may be a device used for interface with an I/O device 215. For example, an input device may include a keyboard, a mouse, a microphone, a camera, etc., and an output device may include a device, such as a display for displaying a communication session of an application, a projector, speakers, etc. As another example, the I/O interface 214 may be a device for interface with an apparatus in which an input function and an output function are integrated into a single function, such as a touch screen. In detail, when processing instructions of the computer program loaded to the memory 211, the processor 212 of the electronic device 110 may display a service screen configured using data provided from the server 150 and/or the electronic device 120, or may display content on a display through the I/O interface 214.

According to other example embodiments, the electronic device 110 and the server 150 may include a greater or lesser number of constituent elements than the number of constituent elements shown in FIG. 2. For example, the electronic device 110 may include at least a portion of the I/O device 215, or may further include other constituent elements, for example, a transceiver, a global positioning system (GPS) module, a camera, a variety of sensors, a database, and the like.

Figure 3:
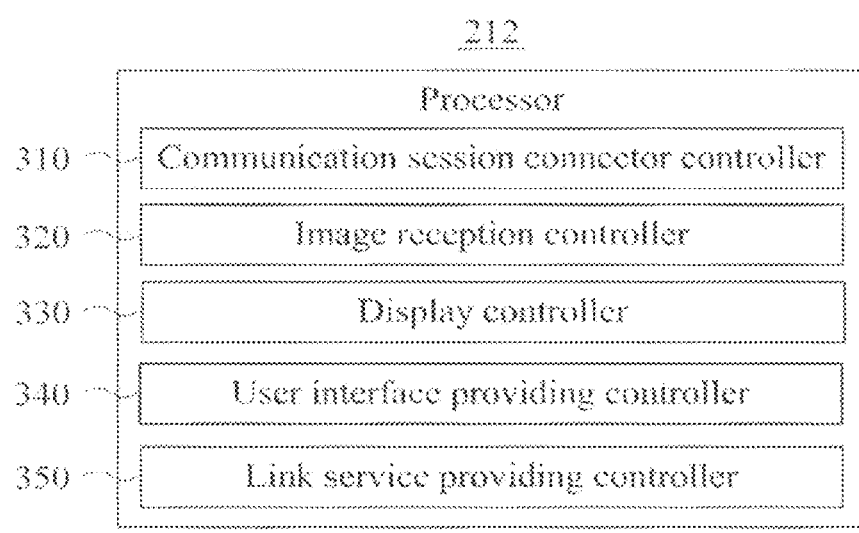
FIG. 3 is a block diagram illustrating an example of a constituent element includable in at least one processor of an electronic device according to at least one example embodiment.
Figure 4:
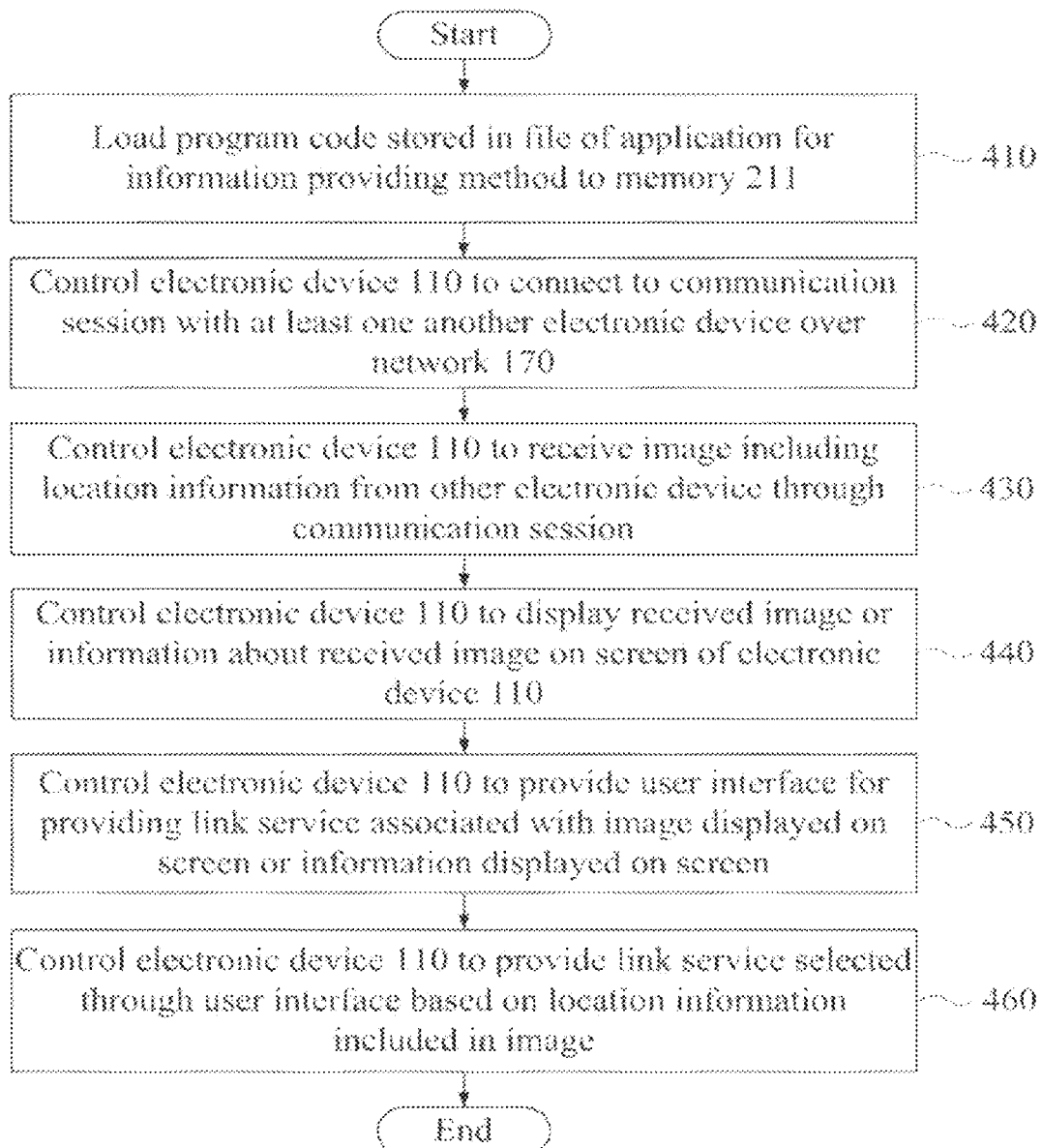
FIG. 4 is a flowchart illustrating an example of a method performed at an electronic device according to at least one example embodiment.

FIG. 3 is a block diagram illustrating an example of a constituent element includable in at least one processor of an electronic device according to at least one example embodiment, and FIG. 4 is a flowchart illustrating an example of a method performed at an electronic device according to at least one example embodiment. Referring to FIG. 3, the processor 212 of the electronic device 110 may include a communication session connector controller 310, an image reception controller 320, a display controller 330, a user interface providing controller 340, and a link service providing controller 350. The constituent elements of the processor 212 may control the electronic device 110 to perform operations 410 through 460 of FIG. 4, and may be configured to execute a code of a code of at least one program and an OS included in the memory 211.

In operation 410, the processor 212 may load a program code stored in one or more files of an application for the information providing method to the memory 211. For example, the program file(s) of the application may be provided from a file distribution server over the network 170 and may be installed in the electronic device 110. In response to executing the application installed in the electronic device 110, the processor 212 may load the program code to the memory 211. In this example, each of the communication session connector controller 310, the image reception controller 320, the display controller 330, the user interface providing controller 340, and the link service providing controller 350 included in the processor 212 may be configured to perform operations 420 through 460 by executing a portion corresponding to the program code loaded to the memory 211. Hereinafter, the constituent elements of the processor 212 control the electronic device 110 may be understood as being the processor 212 that controls other constituent elements of the electronic device 110. For example, the processor 212 may control the communication module 212 included in the electronic device 110 such that the electronic device 110 may receive data from the server 150 and/or another electronic device.

In operation 420, the communication session connection controller 310 may control the electronic device 110 to connect to a communication session with at least one another electronic device over the network 170. For example, an application executed on the electronic device 110 may be a program for receiving a messaging service from the server 150. The communication session may be a chatroom of the messaging service provided from the server 150. In this example, the communication session connection controller 310 may control the electronic device 110 to transmit a request for opening a chatroom with an electronic device, for example, from the other electronic device, of a desired (or, alternatively, predetermined) user to the server 150 over the network 170. Also, the communication session connection controller 310 may control the electronic device 110 to connect to the chatroom generated at the server 150. As another example, the communication session connection controller 310 may control the electronic device 110 to directly set a communication session with another electronic device and to communicate with the other electronic device through the set communication session.

In operation 430, the image reception controller 320 may control the electronic device 110 to receive an image that includes location information from the other electronic device through the communication session. Here, the location information may be GPS information such as latitude, longitude, street address information of the current location of the other electronic device, a location relative to a landmark, a user defined location, and/or other location information.

For example, if the communication session is set by the server 150, the other electronic device may transmit a message, a file, etc., desired to be transmitted to the electronic device 110 to the server 150 through a messaging service. The server 150 may transfer the message, the file, etc., to the electronic device 110 connected to the communication session. In this example, if the other electronic device transmits an image including location information to the server 150, the server 150 may transfer the image to the electronic device 110 through routing, and the image reception controller 320 may control the electronic device 110 to receive the image.

The image including location information may be created using a variety of methods.

For example, if an electronic device A takes a photo using a camera included in the electronic device A, a location measurement module, for example, a GPS module included in the electronic device A may measure a location of the electronic device A corresponding to a time at which the photo is taken. Here, an image including location information may be created by adding, to the taken photo, location information measured at the electronic device A as a location tag and/or location metadata. In this example, the location information may include information about a location corresponding to a time at which the image was created. Here, the other electronic device may be the electronic device A. Also, the other electronic device may be an electronic device that receives a photo from the electronic device A using a variety of methods. For example, a photo uploaded on a website by the electronic device A may be downloaded by the other electronic device and may be transmitted from the other electronic device to the electronic device 110 through a messaging service. As another example, the other electronic device may receive a photo through direct communication, for example, Bluetooth, NFC, etc., communication with the electronic device A. Location information for images that were not initially created by an electronic device that does not include a location measurement module may be provided by the user as a user input and/or may be determined by performing image recognition analysis on the image and determining one or more objects located in the image, such as famous landmarks, street signs, building numbers, geographic indications, textual indications of the location, etc. This location information may be included with the image as a location tag and/or location metadata.

Also, the image including location information may be an image created at the server 150 for the messaging service. For example, the server 150 may provide users with a sticker image including desired (or, alternatively, predetermined) location information among various sticker images provided through the messaging service. As another example, the server 150 may provide a function that enables a user to directly add location information to a desired (or, alternatively, predetermined) sticker image. In this example, if a sticker image A is transmitted to another user through a messaging service by setting a location corresponding to "home" to the sticker image A, a location corresponding to "school" to a sticker image B, and a location corresponding to "company" to a sticker image C, etc., a user may control the sicker image A including the location corresponding to "home" to be automatically transmitted.

In operation 440, the display controller 330 may control the electronic device 110 to display the received image and/or information about the received image on the screen of the electronic device 110. For example, a chatroom may be displayed on the screen of the electronic device 110 and an image and/or information about the image may be displayed through the chatroom.

In operation 450, the user interface providing controller 340 may control the electronic device 110 to provide a user interface for providing at least one link service (e.g., a uniform resource locator (URL) for a desired service, a file locator for a desired file related to a service, a network locator for a related network resource, a redirection link to another software functionality, and/or other resource locator, etc.) associated with the image displayed on the screen or information displayed on the screen. For example, a user interface for selecting a desired link service may include one or more links to services, such as a link service for searching a map for a place corresponding to location information included in an image, a link service for providing a route guide from a current location (for example, a current location of the electronic device 110, etc.) or a specific location (for example, a desired location set by and/or identified by the user of the electronic device 110 to a desired and/or corresponding place), a link service for providing search results from a search engine service about the corresponding place, etc. As another example, the user interface may be displayed in response to a user input on an image, for example, a tap on an area on which the image is displayed on a touch screen.

In operation 460, the link service providing controller 350 may control the electronic device 110 to provide the link service selected through the user interface based on location information included in the image. For example, in response to a user selection on a route guide service, the link service providing controller 350 may provide the route guide service to the user using a route guide function provided from the application (hereinafter, a first application), may provide the route guide service to the user by executing a separate application (hereinafter, a second application) having the route guide function, or may provide the route guide service to the user by executing a browser application that connects to a server, or other network resource, that provides the route guide function (e.g., a web based application). In detail, the link service providing controller 350 may execute the second application through an application programming interface (API) call using location information included in the image as a parameter of the route guidance function. Here, the link service providing controller 350 may provide the user with a route guide function that uses a place and/or location corresponding to location information received as the parameter as a destination under the control of the second application. In this case, the user may use the route guide service by setting a current location and/or a separate location as a departure location. However, in other example embodiments, the location information of the parameter may be used as a departure location parameter and the user may designate a second location as the destination location (e.g., the separate location, the user's current location (for example, in order to give directions to the user's current location to another person), etc.). Other link services may be provided using a function of the first application, using a function of another application, and/or using a function of a web based application. Additionally, more than one function of the first application, the another application, and/or the web based application may also be combined into a single function (e.g., combining route guide service with a messaging service, combining route guide service with a search service, combining a messaging service with a search service, etc.).

According to at least some example embodiments, since location information is transmitted using an image, users may use various link services related to a location associated with the image. Also, a user may set various locations for each image and may transmit an image of a desired location as necessary and/or desired. Accordingly, it is possible to transfer various locations as well as the current location using transmission of an image.

Figure 5:
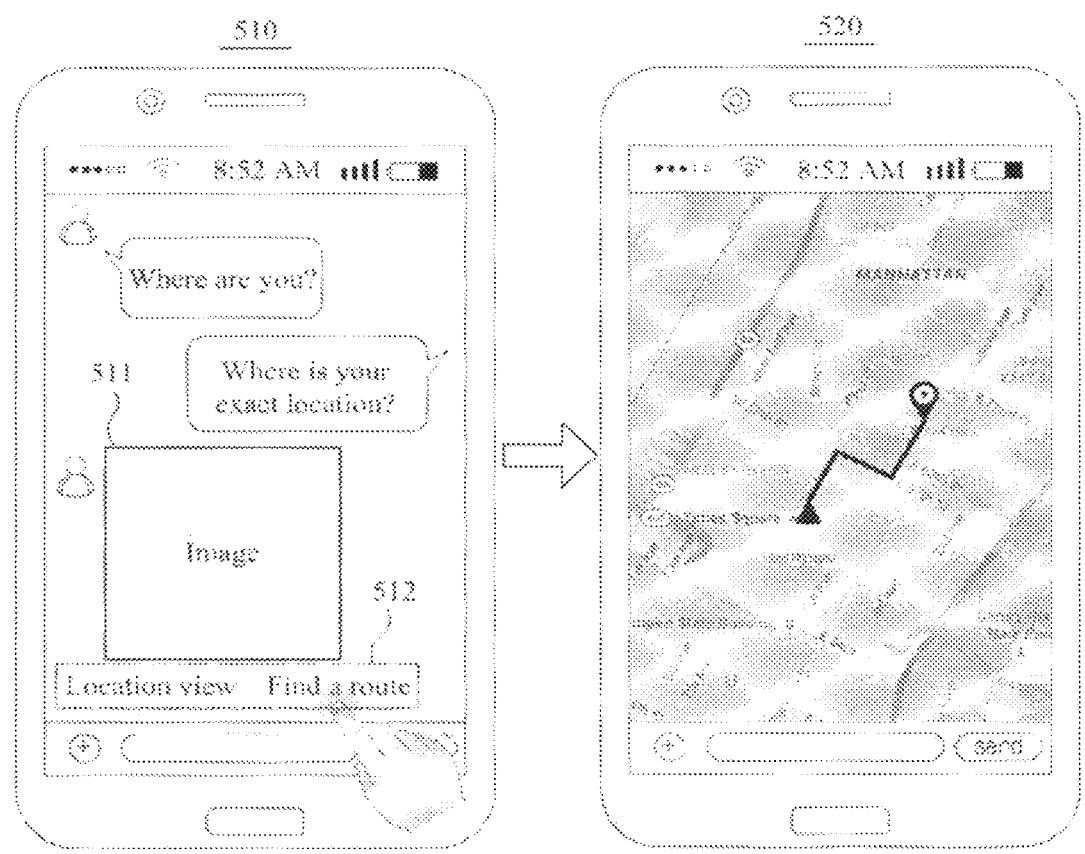
FIG. 5 illustrates an example of a process of transferring location information using an image according to at least one example embodiment.

FIG. 5 illustrates an example of a process of transferring location information using an image according to at least one example embodiment. A first screen 510 of FIG. 5 shows an example of a chatroom screen user interface displayed through an electronic device of a user A. For example, if a user B is to provide location information to the user A, the user B may take a photo using a camera included in an electronic device of the user B and may transmit the taken photo to the electronic device of the user A through a messaging service. In this example, the taken photo may include a location of the electronic device of the user B in a form of a location tag and/or location metadata. Accordingly, once the photo is transmitted, location information may be transferred to the electronic device of the user A together with the photo.

An image 511 displayed on the first screen 510 may correspond to the photo transmitted from the electronic device of the user B in the above example. In FIG. 5, a box 512 indicated with dotted lines is a user interface for selecting a link service "location view" and a link service "find a route" that is provided in association with the image 511, but the example embodiments are not limited to these two link services and may include additional link services.

If the user A taps an area on which the user interface for using the link service "find a route" is displayed, the electronic device of the user A may provide a route guide service from a current location of the electronic device of the user A to a place corresponding to location information included in the image 511. For example, the electronic device of the user A may execute an application for the route guide service and may provide a current location of the electronic device and location information included in the image 511 as parameters of the application. Here, a screen, for example, a second screen 520, for the route guide service may be configured and displayed on the electronic device under the control of the executed application. Here, the route guide service from the current location of the electronic device and/or a location set by the user to a place corresponding to location information included in the image 511 may be provided as a link service.

Also, the link service "location view" may be a service for displaying a place corresponding to location information included in the image 511 using a map image. For example, the user interface providing controller 340 described above with FIGS. 3 and 4 may control the electronic device 110 to display a location sharing interface in association with an area on which the image or information about the image is displayed in operation 450. Here, in response to a selection on the location sharing interface, the link service providing controller 350 may display the map image on which the location corresponding to the location information is marked on the screen of the electronic device 110.

Figure 6:
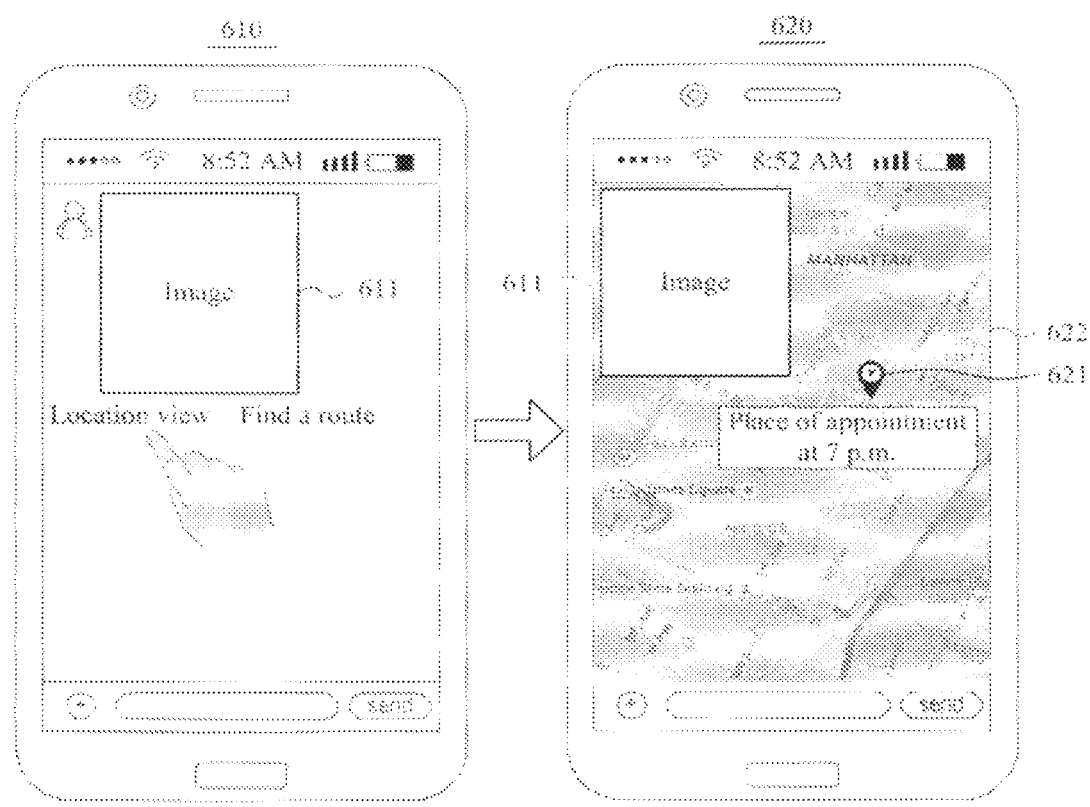
FIG. 6 illustrates an example of a location view link service according to at least one example embodiment.

FIG. 6 illustrates an example of a location view link service according to at least one example embodiment. A first screen 610 of FIG. 6 shows an example of a screen on which an image 611 received at an electronic device of a user is displayed. Here, in response to a user selection on a user interface for selecting a link service "location view", a map image on which a location corresponding to location information included in an image is marked, or otherwise identified, may be provided to the user as shown in a second screen 620.

Referring to the second screen 620, the received image 611 may be further displayed. The received image 611 may be displayed on an area associated with an indicator 621 that indicates a location, or may be displayed on a desired and/or preset area, for example, a left upper-end area of the screen. For example, instead of directly displaying the received image 611 of the first screen 610 on the screen of the electronic device, information about the image 611, such as text information saying, "The image including location information is received," may be displayed on the screen. In this case, the image may be provided for the user in a preview form on the second screen 620, and not on the first screen 610, however, the example embodiments are not limited thereto. A method of displaying the received image 611 on the map image may also be applicable to provide a route guide service of FIG. 5. In detail, the link service providing controller 350 may further display the received image 611 on an area associated with a location marked on the map image or a desired and/or preset area of the screen of the electronic device 110.

Also, the image 611 may further include text information input from a creator of the image 611 and/or an editor in addition to the location information. For example, the text information may include a description of the taken photo, a description of a place/location at which the photo was taken, identification of the people shown in the photo, time and/or date information related to the taking of the photo, etc. In this example, the text information may also be displayed on the screen. In the second screen 620, a box 622 indicated with dotted lines shows an example of displaying "place of appointment at 7 p.m." as text information in association with the indicator 621. In detail, the link service providing controller 350 described above with FIGS. 3 and 4 may further display text information on the screen of the electronic device 110 in association with the location marked, or otherwise identified, on the map image.

The example embodiments are not limited to receiving images through a messaging service. For example, the same service may be provided using an image downloaded from a website, an image received through near field communication between electronic devices, an image received as an attachment to an email, etc.

Also, the link service using location information may be variously applicable in addition to the map service. For example, location information may also be used to receive other images taken at the same place.

Figure 7:
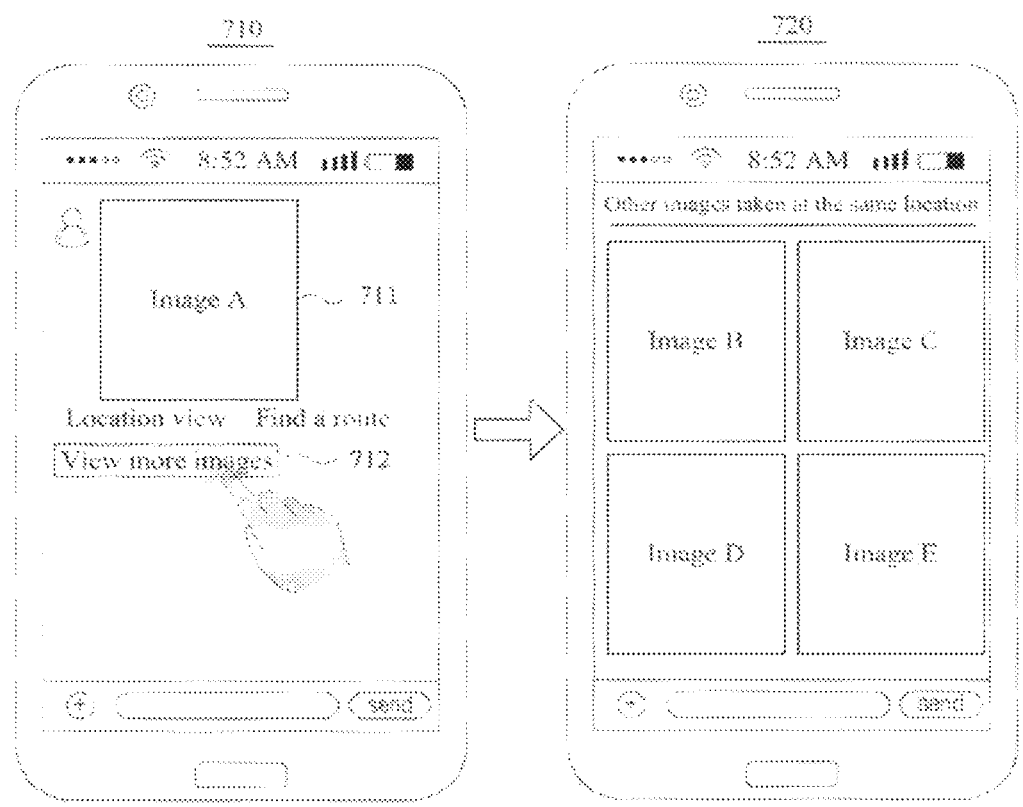
FIG. 7 illustrates an example of providing images of a related place according to at least one example embodiment.

FIG. 7 illustrates an example of providing images of a related place according to at least one example embodiment. A first screen of FIG. 7 (e.g., 710) shows an example of a screen on which an image A 711 received at an electronic device of a user is displayed. Here, a user interface for selecting various link services in association with the image A 711 may be provided through the electronic device. A box 712 indicated with dotted lines is a user interface (hereinafter, a view more images button, for selecting a link service "view more images". In response to a user selection on the user interface, other images, for example, images B, C, D, and E taken at the same place and/or location, may be provided to the user as shown on a second screen 720.

For example, in the example embodiments of FIGS. 3 and 4, in response to a selection on the view more images button, the electronic device may transmit a signal for requesting other images associated with the image A 711 to the server 150. In this case, in response to the selection on the view more images button, the server 150 may determine an area range based on location information included in the image A 711, and may search a database included in the server 150 and/or a website for other images that include location information belonging to the area range and/or other images that correspond to the area range. For example, the server 150 may search for other images that include location information of a place corresponding to location information included in the image A 711. As another example, the server 150 may search for other images that include, as location information, a location within a desired (or, alternatively preset) distance range from a location of location information included in the image A 711. As an additional example, the server 150 may search for other images that have been identified as corresponding to the place, or the desired distance range from the location, using, for example, user identification information of the other images, other classification information related to the other images, image recognition analysis performed on the other images, etc., that identifies the place and/or location associated with the image. Also, the server 150 may transmit the found other images to the electronic device 110. To this end, the link service providing controller 350 may further receive other images that include location information associated with location information included in the image, from the server 150 having set and/or established a communication session, and may display the further received other images on a screen, for example, the second screen 720.

As described above, location information may be marked on an image and such location information may be in accordance with a privacy setting and encryption setting of the transmitter. Accordingly, a function for securely protecting the location information may be provided.

For example, the server 150 may limit location information to be provided only to a user having set (e.g., defined) a relationship level (e.g., family members, personal friends, business associates, all known contacts, open to the general public, etc.) that may have access to the image and/or location information. For example, the initial transmitter (e.g., uploader and/or creator) of the image may set and/or define one or more persons that the transmitter has a personal relationship with, such as, an social network service (SNS) friend, an instant messenger friend, a friend identified through a contact list (e.g., phone contact list, email contact list, personal organizer contact list, etc.), and/or the like, as being allowed to have access to the location information and/or the created image. Also, the server 150 may impose limitations so that location information is available only within a desired period of time, for a desired number of views, etc. Additionally, the server 150 may encrypt the transmission of the image and/or location information using an encryption communication protocol, such as secure sockets layer (SSL), transport layer security (TLS), HTTPS, IPSec, etc., and/or an encryption algorithm, such as RSA encryption, Diffie-Hellman encryption, elliptic curve encryption, etc.

In operation 430 according to example embodiments of FIGS. 3 and 4, the image reception controller 320 may control the electronic device 110 to receive an image transmitted from another electronic device using the communication session, through the server 150 serving the communication session. Also, in addition to the location information, the image may further include at least one of initial transmitter information of the image, valid period information for the location information, other usage restrictions of the image and/or location information, etc.

For example, if a personal relationship is not set between an initial transmitter of the image and the user of the electronic device 110 based on initial transmitter information, the server 150 may transfer, to the electronic device 110, the image in which the initial transmitter information and the location information are removed. Accordingly, since the location information is not included in the received image, it is possible to decrease the likelihood and/or prevent the location information of the image from being erroneously exposed to users having been designated as having a personal relationship with the initial transmitter of the image (or in other words, users that do not have the proper access level to view the transmitter information and/or the location information are not able to view such information).

Also, if a valid period of location information is expired based on the valid period information included in the image, the server 150 may transfer, to the electronic device 110, the image in which the location information is removed. For example, if an image of which a valid period is set as expiring by Aug. 19, 2015, and the image is transmitted on Aug. 20, 2015, the server 150 may transfer, to a corresponding electronic device, the image in which the location information is removed. Accordingly, a transmitter of the image may limit exposing the location information of the image by setting a valid period of the location information included in the image.

Figure 8:
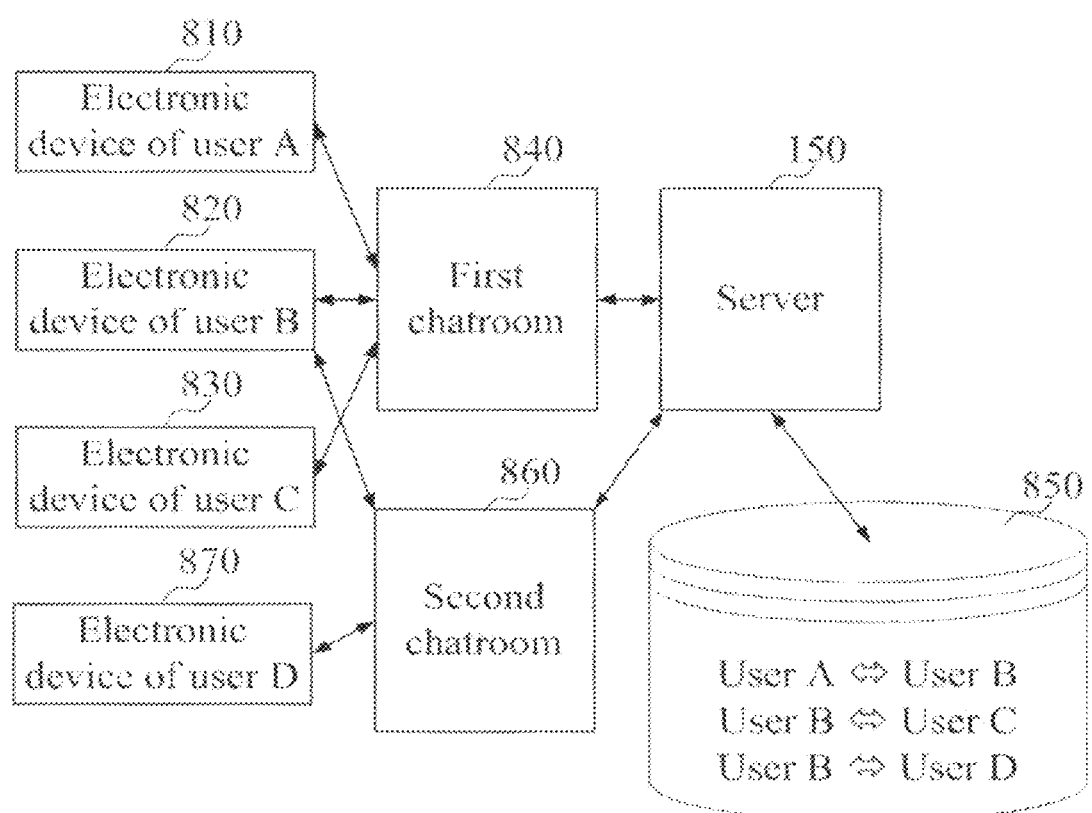
FIG. 8 illustrates an example of limiting providing of location information according to at least one example embodiment.

FIG. 8 illustrates an example of limiting providing of location information according to at least one example embodiment. FIG. 8 illustrates an example of a situation in which an electronic device 810 of a user A, an electronic device 820 of a user B, and an electronic device 830 of a user C communicate with one another through connection to a first chatroom 840. Here, the first chatroom 840 is a communication session set by the server 150.

The server 150 may verify whether a valid period for location information is set in an image when the image is received from the electronic device 810 of the user A. If the valid period is set, the server 150 may verify whether the valid period is expired. If the valid period is expired, the server 150 may transfer, to the electronic device 820 of the user B and the electronic device 830 of the user C, the image with the location information removed. In this example, the user B and the user C may not use a link service based on the location information.

If the valid period is not expired, the server 150 may verify whether users, for example, the user B and the user C, to receive the image have a desired and/or required personal relationship with an initial transmitter of the image and/or have the proper access level to view the location information. If the initial transmitter of the image is the user A, the server 150 may verify whether the user B and the user C have the desired and/or required personal relationship with the user A by referring to a database 850. For example, the server 150 may search the database 850 and may verify that the user B has the desired and/or appropriate personal relationship with the user A, but may verify that the user C does not have the desired and/or required the personal relationship with the user A. In this example, the server 150 may transmit the image including the location information to the electronic device 820 of the user B. Also, the server 150 may transmit, to the electronic device 830 of the user C, the image in which the location information is removed. Accordingly, the user B may use a variety of link services based on the location information included in the image, whereas the user C may not use such link services.

The initial transmitter may be determined at the server 150 based on an identifier of the image and an identifier of the image transmitter. Initial transmitter information may be included in the image. The valid period for location information may be set by a creator of the image and/or an editor and may be included in the image.

If it is assumed that the user B transfers an image including location information to a user D communicating with the user B through a second chatroom 860, the server 150 may search the database 850 to verify whether a desired and/or required personal relationship is set between the user A and the user D. In this example, since the desired and/or required personal relationship is not set between the user A and the user D, the server 150 may transfer, to an electronic device 870 of the user D, the image in which the location information is removed. Accordingly, the user D may not use the link service based on the location information.

An image, such as a photo taken with a camera, may be used. According to other example embodiments, other images, such as a sticker image provided from a messaging service, may also be used.

In the example embodiments of FIGS. 3 and 4, an image received at the electronic device 110 from the other electronic device through the communication session may include a sticker image selected at the other electronic device from among sticker images provided from other electronic devices through the messaging service. Here, the location information may include a location of the other electronic device corresponding to a time at which the sticker image is selected at the other electronic device. As another example, the location information may include a location input and stored in advance with respect to the sticker image being selected at the other electronic device.

Figure 9:
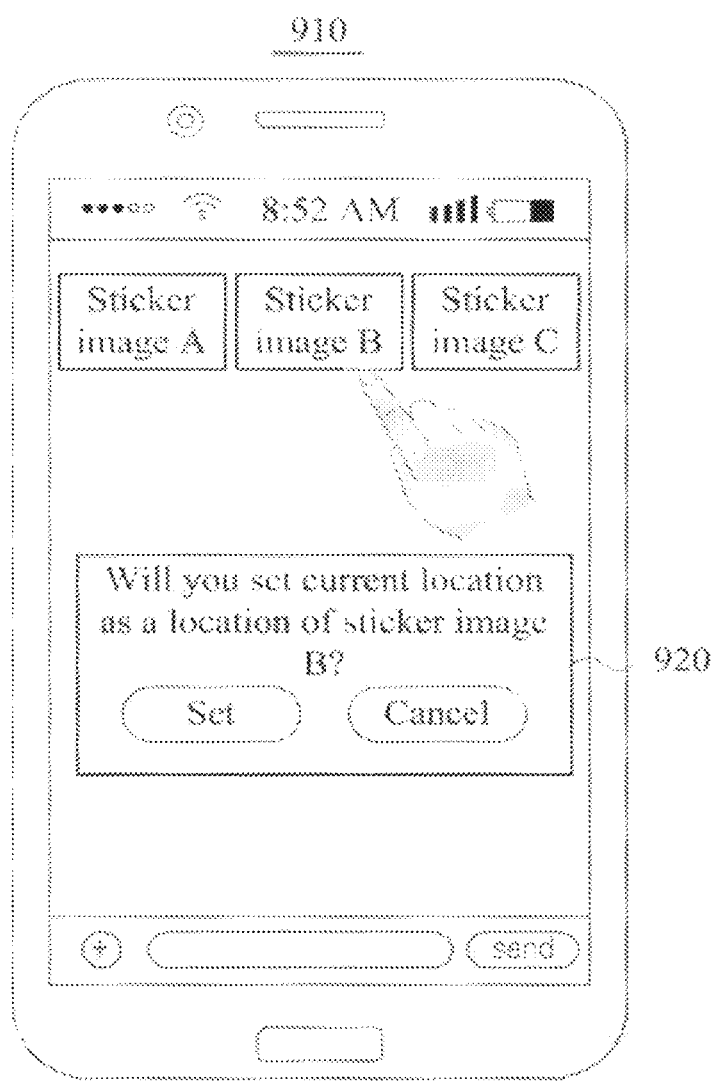
FIG. 9 illustrates an example of setting location information to a sticker image according to at least one example embodiment.
Figure 10:
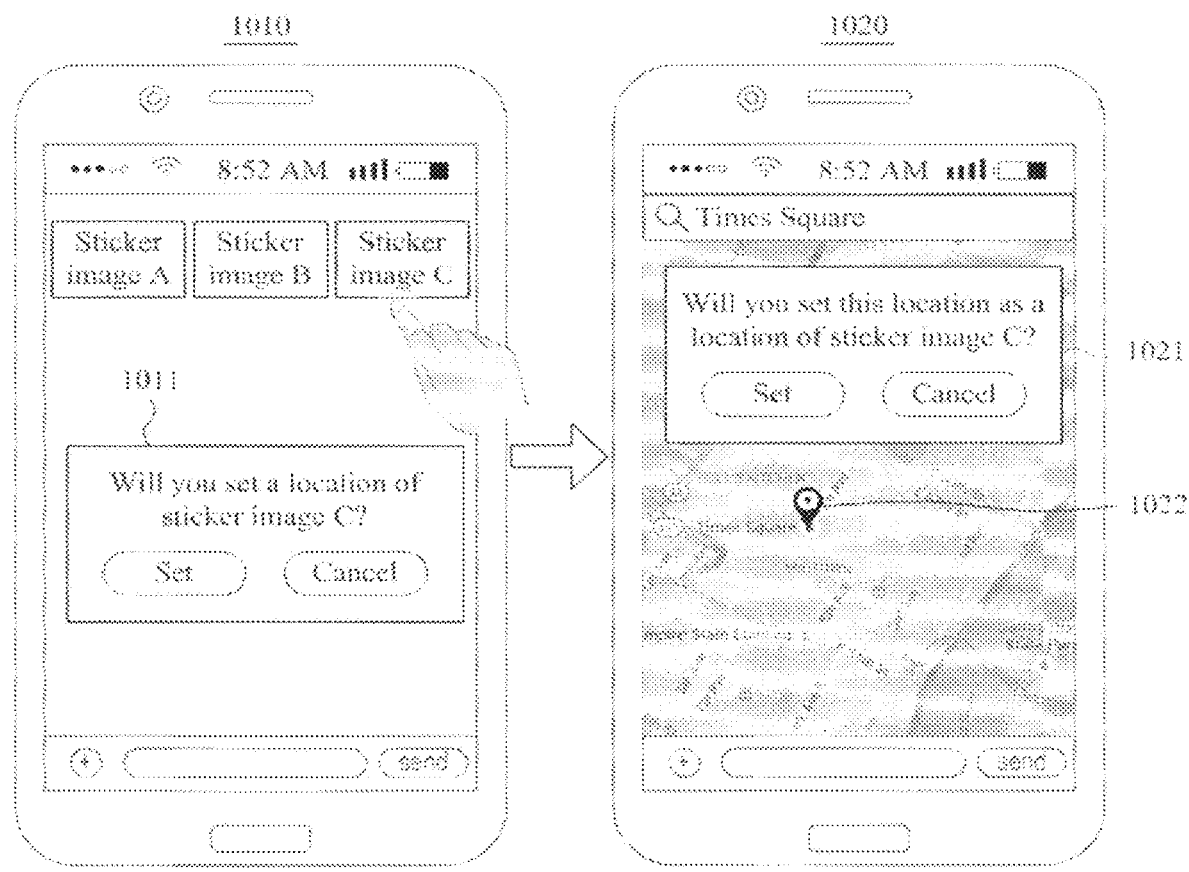
FIG. 10 illustrates another example of setting location information to a sticker image according to at least one example embodiment.
Figure 11:
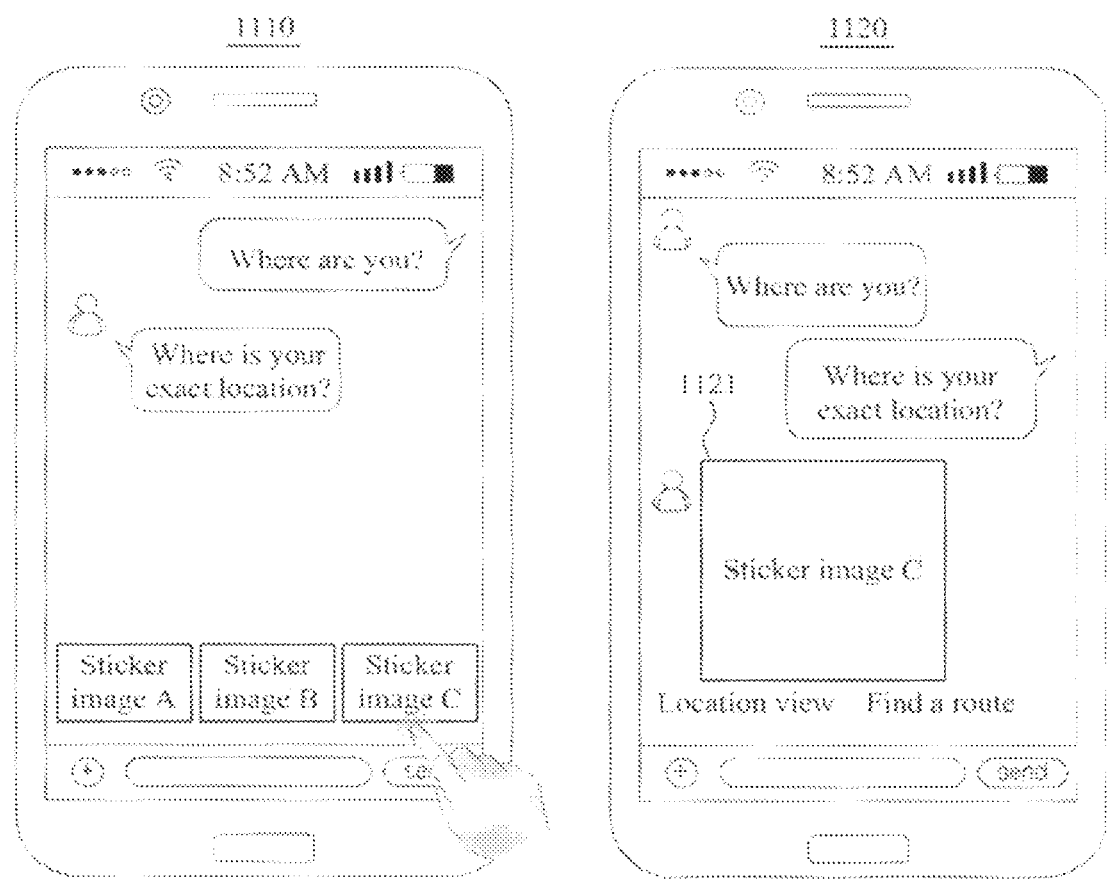
FIG. 11 illustrates an example of providing location information using a sticker image according to at least one example embodiment.

FIG. 9 illustrates an example of setting location information for a sticker image according to at least one example embodiment, FIG. 10 illustrates another example of setting location information for a sticker image according to at least one example embodiment, and FIG. 11 illustrates an example of providing location information through a sticker image according to at least one example embodiment.

A screen 910 of FIG. 9 shows an example of displaying a pop-up 920 for setting a current location as a location of a sticker image B in response to a user selection on the sticker image B from among a plurality of sticker images that includes a sticker image A, the sticker image B, and a sticker image C. Here, the user selection may be performed by touching an area on which the sticker image is displayed during at least a desired and/or preset period of time. If the current location is set as the location of the sticker image B, information about a current location of an electronic device may be collected from, for example, the location measurement module of the electronic device, stored, and matched to the sticker image B.

A first screen 1010 of FIG. 10 shows an example of displaying a pop-up 1011 for verifying whether to set a location of the sticker image C in response to a user selection on the sticker image C from among a plurality of sticker images that includes the sticker images A, B, and C. Here, the user selection may be performed by touching an area of the sticker image C during at least a desired and/or preset period of time. In response to a user selection on a setting button, a map service for setting a location of the sticker image C may be provided to the user as shown in a second screen 1020 of FIG. 10. The second screen 1020 shows an example of displaying a pop-up 1021 for verifying whether to set a location of "Times Square" as a location of the sticker image C in response to a user search for a specific location, i.e., "Times Square". If the user selects a setting button on the second screen 1020, a location marked with an indicator 1022 on a map may be stored by being matched to the sticker image C.

A sticker image and location information may be stored in a storage device of an electronic device under control of an application executed on the electronic device. Additionally, the sticker image and the location information may be stored in the server 150. For example, the server 150 may match location information for each user and each sticker image and thereby store and manage the location information.

A first screen 1110 of FIG. 11 shows an example of a screen of an electronic device of a first user on which a chatroom connected with the first user and a second user is displayed. On the first screen 1110, the first user selects the sticker image C during a conversation, a chatroom session, a messaging session, a texting session, an email exchange, etc. In response to the user selection on the sticker image C, the electronic device of the first user may transmit an identifier of the sticker image C to the server 150.

In this example, the server 150 may acquire location information matched to the sticker image C based on an identifier of the received sticker image C and an identifier of the first user, and may transmit the acquired location information to an electronic device of the second user by matching the location information to the sticker image C, for example, by including a location tag in the sticker image C or together with the identifier of the sticker image C and the location tag.

A second screen 1120 of FIG. 11 shows an example of a screen of the electronic device of the second user. The electronic device of the second user may display the sticker image C received from the server 150 on the screen. Accordingly, the second user may use a variety of link services based on the location information included in the sticker image C.

Figure 12:
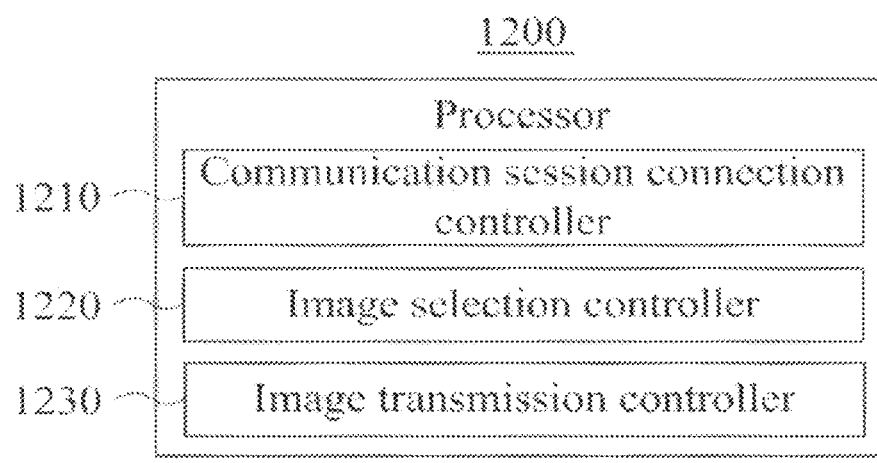
FIG. 12 illustrates another example of a constituent element includable in at least one processor of an electronic device according to at least one example embodiment.
Figure 13:
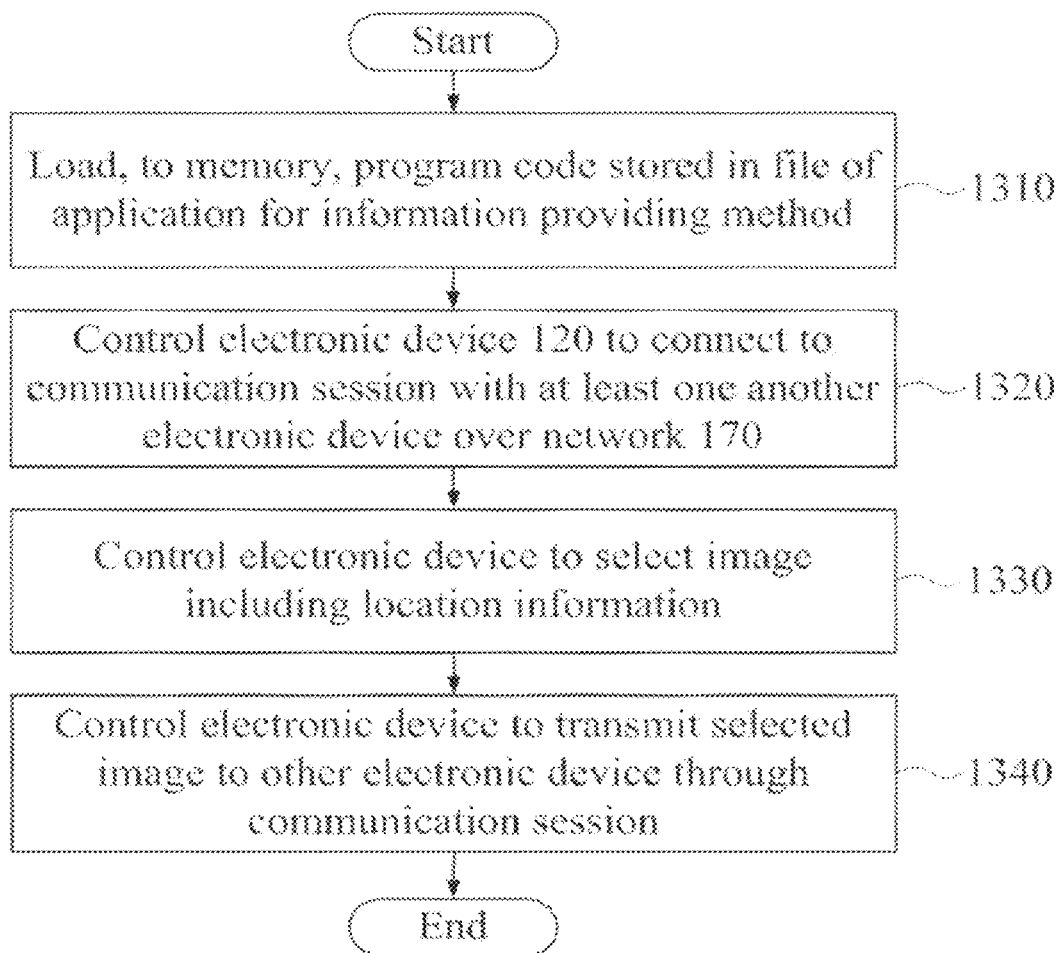
FIG. 13 is a flowchart illustrating another example of a method performed at an electronic device according to at least one example embodiment.

FIG. 12 illustrates another example of a constituent element includable in a processor of an electronic device according to at least one example embodiment, and FIG. 13 is a flowchart illustrating another example of a method performed at an electronic device according to at least one example embodiment. An example in which the electronic device 120 transmits an image to another electronic device will be described, but the example embodiments are not limited thereto.

Referring to FIG. 12, at least one processor 1200 of the electronic device 120 may include a communication session connection controller 1210, an image selection controller 1220, and an image transmission controller 1230, but is not limited thereto. Constituent elements of the processor 1200 may control the electronic device 120 to perform operations 1310 through 1340 included in the method of FIG. 13, and may be configured to execute at least one program code and an OS included in a memory (not shown) of the electronic device 120. The at least one program code may include a code of an application installed and executed on the electronic device 120 to provide a service of a server, for example, the server 150 to the electronic device 120. The application may be the same as the application installed and executed on the electronic device 120.

In operation 1310, the processor 1200 may load, to a memory, a program code stored in a file of an application for the information providing method. For example, the program file of the application may be provided from a file distribution server over the network 170, and may be installed in the electronic device 120. In response to executing the application installed in the electronic device 120, the processor 1200 may load the program code to the memory. Here, each of the communication session connection controller 1210, the image selection controller 1220, and the image transmission controller 1230 included in the processor 1200 may be configured to perform the following operations 1320 through 1340 by executing a portion corresponding to the program code loaded to the memory. Hereinafter, that the constituent elements of the processor 1200 control the electronic device 120 may be understood that the processor 1200 controls other constituent elements of the electronic device 120. For example, the processor 1200 may control a communication module (not shown) included in the electronic device 120 such that the electronic device 120 may transmit data to the server 150 or another electronic device.

In operation 1320, the communication session connection controller 1210 may control the electronic device 120 to connect to a communication session with at least one another electronic device over the network 170. Here, the other electronic device may correspond to the aforementioned electronic device 110.

In operation 1330, the image selection controller 1220 may control the electronic device 120 to select an image including location information. The image including location information is described above. For example, the image selection controller 1220 may control the electronic device 120 to select a photo taken with a camera (not shown) of the electronic device 120. As another example, the image selection controller 1220 may control the electronic device 120 to select a photo selected by the user from among photos stored in a storage device (not shown) of the electronic device 120. As another example, the image selection controller 1220 may control the electronic device 120 to select a sticker image selected by the user from among a plurality of sticker images provided to the electronic device 120 through a messaging service. In this example, the image selection controller 1220 may display the plurality of sticker images provided through the messaging service of the server having set a communication session on the screen of the electronic device 120 and may regard, as the image, a sticker image selected from among the plurality of sticker images displayed on the screen.

According to some example embodiments, location information may include a location of the electronic device 120 corresponding to a time at which the sticker image is selected at the electronic device 120.

According to other example embodiments, the processor 1200 may further include a sticker image location setter (not shown). The sticker image location setter may perform setting a location for each of at least one sticker image among the plurality of sticker images prior to operation 1330. For example, to set a location for each sticker image, the sticker image location setter may set a location corresponding to a sticker image selected by the user as a location of the electronic device 120 corresponding to a location setting time and/or may set a location corresponding to the sticker image selected by the user as a location selected on a map image by the user.

To provide location information using a sticker image, the processor 1200 may further include a sticker image location setting controller (not shown). The image location setting controller may perform setting a location for each of at least one sticker image among the plurality of sticker images prior to operation 1330. [0125] In operation 1340, the image transmission controller 1230 may control the electronic device 120 to transmit the selected image to the other electronic device through the communication session. Here, a user interface for providing a link service associated with the image may be provided from the other electronic device. The link service selected through the user interface may be provided to the user of the other electronic device based on location information included in the image.

The electronic device 120 refers to an electronic device that transmits an image including location information. Description related thereto omitted in FIGS. 12 and 13 may refer to the description made above with reference to FIGS. 1 to 11.

Figure 14:
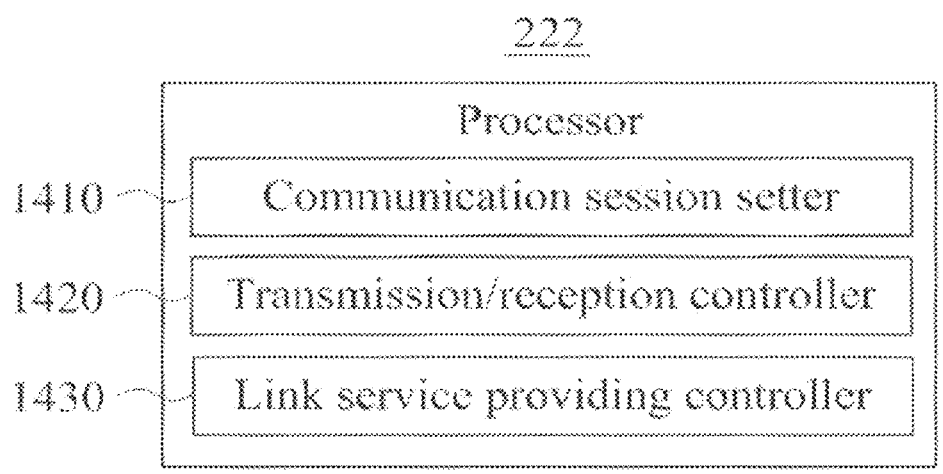
FIG. 14 is a block diagram illustrating an example of a constituent element includable in at least one processor of a server according to at least one example embodiment.

FIG. 14 is a block diagram illustrating an example of a constituent element includable in a processor of a server according to at least one example embodiment, and FIG. 15 is a flowchart illustrating an example of a method performed at a server according to at least one example embodiment. Referring to FIG. 14, the at least one processor 222 of the server 150 may include a communication session setter 1410, a transmission/reception controller 1420, and a link service providing controller 1430, but is not limited thereto. The constituent elements of the processor 222 may control the electronic device 120 to perform operations 1510 through 1540 included in the method of FIG. 15, and may be configured to execute at least one program code and an OS included in a memory (not shown) of the electronic device 120. Here, the at least one program code may include a code of the application installed and executed on the electronic device 120 to provide a service of a server, for example, the server 150 to the electronic device 120. The application may be the same as the application installed and executed on the electronic device 110.

In operation 1510, the processor 222 may load, to the memory 221, a program code stored in a file of an application for the information providing method. For example, the application may be installed in the server 150 through the program file. In response to executing the application installed in the server 150, the processor 222 may load the program code to the memory 221. Each of the communication session setter 1410, the transmission/reception controller 1420, and the link service providing controller 1430 included in the processor 222 may be configured to perform the following operations 1520 through 1540 by executing a portion corresponding to the program code loaded to the memory 222. Hereinafter, that constituent elements of the processor 222 control the server 150 may be understood as that the processor 222 controls other constituent elements of the server 150. For example, the processor 222 may control the communication module 223 included in the server 150 such that the server 150 may transmit and receive data to another server, for example, the server 160 or the electronic devices 110 through 140.

In operation 1520, the communication session setter 1410 may set a communication session between a plurality of electronic devices, such as a first electronic device and a second electronic device. If necessary, the communication session setter 1410 may set a communication session that involves many electronic devices.

In operation 1530, the transmission/reception controller 1420 may control the server 150 to receive an image including location information from the first electronic device through the communication session and to transfer the received image to the second electronic device. For example, the first electronic device may correspond to the electronic device 120 described as an electronic device that transmits the image, and the second electronic device may correspond to the electronic device 110 described as an electronic device that receives the image.

The location information may include information about a location corresponding to a time at which the image of the electronic device having created the image is created. The electronic device having created the image may include the first electronic device or a third electronic device that uploads the image on a website, a server, a SNS, a network storage device, a cloud storage device, etc.

In operation 1540, the link service providing controller 1430 may control the server 150 to provide a link service to the second electronic device based on location information included in the image in response to a selection on the link service associated with the image at the second electronic device. For example, the link service providing controller 1430 may control the server 150 to provide a route guide service for the location corresponding to the location information to the second electronic device using a map image.

According to other example embodiments, in response to a selection on a link service associated with an image, the transmission/reception controller 1420 may control the server 150 to determine an area range based on location information included in the image, and to search a database or a website for another image including the location information belonging to the area range and to further transmit the found image to the second electronic device. Providing of the other image is described with reference to FIG. 7.

According to other example embodiments, the link service providing controller 1430 may control the server 150 to provide, to the second electronic device, a map image on which a location corresponding to location information is marked through a link service selected at the second electronic device.

According to other example embodiments, the image may further include initial transmitter information of the image. In this case, if a personal relationship and/or access/permission level is not set between an initial transmitter of the image and a user of the second electronic device based on the initial transmitter information, the transmission/reception controller 1420 may control the server 150 to transfer, to the second electronic device, the image in which the initial transmitter information and the location information are removed.

According to other example embodiments, the image may further include valid period information for location information. In this case, if a valid period of the location information is expired based on the valid period information included in the image, the transmission/reception controller 1420 may control the server 150 to transfer, to the second electronic device, the image in which the location information is removed.

According to other example embodiments, the transmission/reception controller 1420 may control the server 150 to provide a plurality of sticker images to the first electronic device through a messaging service, and to receive, as the image, a sticker image selected at the first electronic device from among the plurality of sticker images.

According to other example embodiments, the location information may include a location of the first electronic device corresponding to a time at which the sticker image is selected at the first electronic device or a location input and stored in advance with respect to the sticker image selected at the first electronic device.

Description omitted in FIGS. 14 and 15 may refer to the description made above with reference to FIGS. 1 through 13.

According to at least some example embodiments, it is possible to transfer a location of an electronic device corresponding to a time at which a photo is taken, a current location of the electronic device, or a location desired and/or preset by a user for each image by transferring a photo or an image, such as a sticker, in which location information between electronic devices is included over a network.

The units described herein may be implemented using hardware components and/or a combination of hardware components and software components. For example, a processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such as parallel processors.

The example embodiments may be recorded in non-transitory computer-readable media including program instructions to implement various operations embodied by a computer. The media may also include, alone or in combination with the program instructions, data files, data structures, and the like. The media and program instructions may be those specially designed and constructed for the purposes, or they may be of the kind well-known and available to those having skill in the computer software arts. Examples of non-transitory computer-readable media include magnetic media such as hard disks, floppy disks, and magnetic tape; optical media such as CD ROM disks and DVD; magneto-optical media such as floptical disks; and hardware devices that are specially to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be to act as one or more software modules in order to perform the operations of the above-described embodiments.

The foregoing description has been provided for purposes of illustration and description. It is not intended to be exhaustive or to limit the disclosure. Individual elements or features of a particular example embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An information providing method performed by a first electronic device, the information providing method comprising:

establishing a chatroom between the first electronic device and a second electronic device;

activating a camera of the first electronic device and capturing an image by the camera of the first electronic device in response to a user request for executing a location information transmission feature of the chatroom;

acquiring location information of the first electronic device that indicates a location of the first electronic device at a time when the image was captured;

adding the location information of the first electronic device at the time when the image was captured, to the image; and transmitting the image including the location information to a server of the chatroom that provides a messaging service, to enable the server to forward the image including the location information to the second electronic device in response to a predetermined setting being satisfied, and enable the server to remove the location information from the image to generate a location-removed image and forward the location-removed image to the second electronic device in response to the predetermined setting being not satisfied, wherein the predetermined setting comprises a relationship that is set on the messaging service between a user of the first electronic device and a user of the second electronic device, wherein the transmitting comprises:

in response to the relationship set on the messaging service between the user of the first electronic device and the user of the second electronic device, corresponding to a predetermined relationship, transmitting the image comprising the location information from the first electronic device to the server, to cause the server to transmit the image comprising the location information to the second electronic device; and in response to the relationship being set on the messaging service between the user of the first electronic device and the user of the second electronic device, not corresponding to the predetermined relationship, transmitting the image including the location information from the first electronic device to the server, to cause the server to transmit the location-removed image to the second electronic device.

2. The information providing method of claim 1, wherein an activation of at least one service associated with the image is allowed in response to the relationship set between the user of the first electronic device and the user of the second electronic device on the messaging service, corresponding to the predetermined relationship, and the activation of the at least one service associated with the image is restricted in response to the relationship set between the user of the first electronic device and the user of the second electronic device on the messaging service, not corresponding to the predetermined relationship.

3. The information providing method of claim 1, wherein the adding the location information to the image comprises:

inserting a valid time period of the location information into the image, so that the image comprising the location information is transmitted from the server to the second electronic device in response to the valid time period not being expired, and the location-removed image is transmitted from the server to the second electronic device in response to the valid time period being expired.

4. The information providing method of claim 3, further comprising:
allowing an activation of at least one service associated with the image in response to the valid time period not being expired, and
restricting the activation of the at least one service associated with the image in response to the valid time period being expired.

5. A first electronic device comprising:
at least one memory configured to store one or more instructions; and
at least one processor configured to execute the one or more instructions to:
establish a chatroom between the first electronic device and a second electronic device;
activate a camera of the first electronic device and capture an image by the camera of the first electronic device, in response to a user request for executing a location information transmission feature of the chatroom;
acquire location information of the first electronic device that indicates a location of the first electronic device at a time when the image was captured;
add the location information of the first electronic device at the time when the image was captured, to the image; and
transmit the image including the location information to a server of the chatroom that provides a messaging service, to enable the server to forward the image including the location information to the second electronic device in response to a predetermined setting being satisfied, and enable the server to remove the location information from the image to generate a location-removed image and forward the location-removed image to the second electronic device in response to the predetermined setting being not satisfied,
wherein the predetermined setting comprises a relationship that is set on the messaging service between a user of the first electronic device and a user of the second electronic device, and
wherein the at least one processor is further configured to execute the one or more instructions to:
in response to the relationship set on the messaging service between the user of the first electronic device and the user of the second electronic device, corresponding to a predetermined relationship, transmit the image comprising the location information from the first electronic device to the server, and cause the server to transmit the image comprising the location information to the second electronic device; and
in response to the relationship set on the messaging service between the user of the first electronic device and the user of the second electronic device, not corresponding to the predetermined relationship, transmit the image including the location information from the first electronic device to the server, and cause the server to transmit the location-removed image to the second electronic device.

6. The first electronic device of claim 5, wherein the at least one processor is further configured to execute the one or more instructions to:
allow an activation of at least one service associated with the image in response to the relationship set between the user of the first electronic device and the user of the second electronic device on the messaging service, corresponding to the predetermined relationship, and
restrict the activation of the at least one service associated with the image in response to the relationship set between the user of the first electronic device and the user of the second electronic device on the messaging service, not corresponding to the predetermined relationship.

7. The first electronic device of claim 5, wherein the at least one processor is further configured to execute the one or more instructions to:
add the location information to the image by inserting a valid time period of the location information into the image, so that the image comprising the location information is transmitted from the server to the second electronic device in response to the valid time period not being expired, and the location-removed image is transmitted from the server to the second electronic device in response to the valid time period being expired.

8. The first electronic device of claim 7, wherein the at least one processor is further configured to execute the one or more instructions to:
allow an activation of at least one service associated with the image in response to the valid time period not being expired, and
restrict the activation of the at least one service associated with the image in response to the valid time period being expired.

9. A messaging service server for providing a messaging service, the messaging service server comprising:
at least one memory configured to store one or more instructions; and
at least one processor configured to execute the one or more instructions to:
establish, between an first electronic device and a second electronic device, a communication session for providing the messaging service;
receive, from the first electronic device, an image comprising location information that indicates a location of the first electronic device at a time when the image was captured;
receive, from the second electronic device, a request for a service associated with the image, among a plurality of different services available based on the location information included in the image; and
forward the image comprising the location information to the second electronic device to provide the second electronic device with the requested service in response to a predetermined setting being satisfied; and
remove the location information from the image to generate a location-removed image and transfer the location-removed image to the second electronic device to deny the requested service in response to the predetermined setting being not satisfied,
wherein the predetermined setting comprises a relationship that is set on the messaging service between a user of the first electronic device and a user of the second electronic device, and
the at least one processor is further configured to execute the one or more instructions to:
in response to the relationship between the user of the first electronic device and the user of the second electronic device corresponding to a predetermined relationship, transmit the image comprising the location information to the second electronic device; and in response to the relationship between the user of the first electronic device and the user of the second electronic device not corresponding to the predetermined relationship, transmit the location-removed image on which the location information is removed from the image to the second electronic device.

10. The messaging service server of claim 9, wherein the predetermined setting comprises a valid time period of the location information, and the at least one processor is further configured to execute the one or more instructions to:

in response to the valid time period not being expired, transmit the image comprising the location information from the messaging service server to the second electronic device, and in response to the valid time period being expired, transmit the location-removed image from the messaging service server to the second electronic device.

11. The messaging service server of claim 9, wherein the plurality of different services available based on the location information comprise a route guide service for providing a map image that includes a route related to the location of the first electronic device, and the at least one processor is further configured to execute the one or more instructions to provide the map image including the route related to the location of the first electronic device.

12. The messaging service server of claim 9, wherein the plurality of different services available based on the location information comprise searching an area within a predetermined distance from the location of the first electronic device, and the at least one processor is further configured to execute the one or more instructions to provide a result of the searching of the area within the predetermined distance from the location of the first electronic device.

* * * * *